United States Patent Office 3,331,795
Patented July 18, 1967

3,331,795
NOVEL COATING COMPOSITIONS
Theodore R. Hopper, Cranford, N.J., assignor to FMC Corporation, New York, N.Y., a corporation of Delaware
No Drawing. Filed Oct. 9, 1962, Ser. No. 229,492
2 Claims. (Cl. 260—28.5)

This application relates to novel coating compositions, and more particularly, to coating compositions containing coal tar and epoxidized polybutadiene resin.

Coating compositions are currently being prepared from glycidyl polyether epoxy resins which are derived from the condensation of a bisphenol with epichlorohydrin by blending the epoxy resin and an amine curing agent with a phenolic pitch or a coal tar pitch. These coatings were first taught by Bradley in Patent No. 2,528,417, wherein the use of phenolic pitches is taught. An improvement over this system is taught in Patent No. 2,765,288 to Whittier et al., who made the discovery that glycidyl polyethers are compatible with coal tar pitches. These coating systems have been used for a number of years and are quite satisfactory except that they are subject to a disagreeable appearance known as "amine blush" which is a surface whitening. This surface discoloration appears to be due to the use of amines as curing agents in the coating system. There has been much investigation in recent years of methods for overcoming this whitening problem. However, no completely satisfactory solution to the problem has been found heretofore.

It is an object of this invention to provide novel coating compositions which contain an epoxy resin but are completely free of the defect known as "amine blush."

I have now discovered a novel coating composition which is free of the defect of "amine blush," which comprises a coal tar having a softening point of 35–60° C., 0.8–1.2 parts, per part of coal tar, of an epoxidized polybutadiene having an epoxy oxygen content of 7–11%, 0.5–1.2 equivalents, per equivalent of epoxy oxygen, of a curing agent selected from the group consisting of polycarboxylic acids, their anhydrides, and mixtures thereof. When a mere substitution of epoxidized polybutadiene for the glycidyl polyether in the composition of Whittier et al. is made using the amine curing agents of Whittier et al., no satisfactory coating is obtained. Quite surprisingly however, the compositions of this invention form coatings which have very satisfactory properties using polycarboxylic acids or anhydrides as the curing agent. Moreover, the above coating compositions do not require an amine curing agent and thus completely eliminate the problem of "amine blush."

The epoxidized polybutadienes used as the base resin for the coating compositions taught herein are prepared by epoxidizing a liquid polymer of butadiene. The butadiene may be polymerized in any well known manner, such as emulsion or solution polymerization using a variety of catalyst, including free-radical, alkali metal, Friedel-Crafts, and organo-metallic catalysts. Useful techniques for the polymerization of butadiene are described in Patent Nos. 2,631,175 and 2,791,618.

Although any liquid polybutadiene may be epoxidized to an epoxy oxygen content of about 7–11%, a convenient molecular weight range for the polybutadiene is a number average of about 250–10,000. Best results are generally obtained with polymers having a molecular weight below about 2,500, corresponding to a viscosity below about 50 poises, measured at 25° C. and extrapolated to zero shear. Although the higher polymers are useful, they are very viscous when epoxidized, and thus it is generally necessary to dissolve the polymer in a solvent before carrying out the epoxidation. The lower limit of the molecular weight range for these polymers is about 100; that is, mixtures of dimers and trimers could actually be used, should they be desired to impart particular properties for special applications.

For the epoxidation of the polybutadiene, standard epoxidation techniques may be used. Aliphatic, aromatic, and inorganic peracids, salts of peracids, peroxides, and hydroperoxides are the most common of the effective epoxidizing agents. For convenience, the lower aliphatic peracids such as performic, peracetic, perpropionic, and perbutyric are preferred reagents. With these reagents, the epoxidation reaction may be carried out using a preformed peracid mixture, or the peracid may be formed in the reaction medium, generally by adding hydrogen peroxide to an aliphatic acid or anhydride medium. Peracids may be prepared in any known way, such as is described in Organic Synthesis, Reinhold Publishing Corp. (1957), page 302. A number of epoxidation techniques for polybutadienes are illustrated in Patent No. 2,826,556 to F. P. Greenspan and A. E. Pepe.

Preferably, the epoxidation is carried out by the in situ formation of peracetic acid, whereby the polybutadiene is reacted with acetic acid and hydrogen peroxide in the presence of an ion exchange resin and a solvent. The solvent may be any low-boiling solvent for the product, such as benezene or toluene. When the reaction is complete, the epoxidation product is allowed to separate into an aqueous phase and a solvent phase. The solvent is then removed from the resin product by vacuum stripping. This method of epoxidation is described by F. P. Greenspan and R. J. Gall in Patent No. 2,919,283.

The epoxidation may be conducted using stoichiometric amounts of the peracid; that is, one mole of peracid per double bond in the polymer; or an amount below that theoretically required may be used. There is no significant advantage in using excess oxidant. In general, the epoxidized polybutadiene should contain at least about 7% by weight of epoxy oxygen, and it is preferred for most applications to employ epoxidized polybutadienes containing about 8–10% epoxy oxygen. Resins containing less than 7% epoxy oxygen may be used, but reactivity is reduced and the resulting films tend to be less resistant. Epoxidized polybutadienes containing more than about 10% epoxy oxygen tend to be extremely viscous, especially in the higher molecular weight range; but this may actually be desired for special applications.

The coating compositions of this invention are prepared by blending the epoxidized polybutadiene with a coal tar in the presence of an acid or anhydride curing agent. The coal tar may be any residue resulting from the destructive distillation of coal and having a softening point of about 35–60° C. When these materials are obtained by redistillation of the coal tar, they are generally referred to as coal tar pitch. The important thing is that it be a coal residue obtained by distillation and having a softening point of about 35–60° C. In view of the fact that epoxidized polybutadienes are quite different in structure from the glycidyl polyethers of Whittier et al., it is quite surprising that these coal tars are compatible with the epoxy resins used in this invention.

Best results are obtained when approximately equal amounts of coal tar and epoxy resin are employed. Generally, about 0.8–1.2 parts of resin may be employed for each part of coal tar. When less than 0.8 part of resin is employed, the final coating does not develop sufficient hardness to be suitable for most applications. The upper limit of 1.2 parts of resin per part of coal tar is set by economic considerations. Since coal tar is quite cheap, it is desirable to use as much as possible, consistent with the desired properties for the final coating.

The curing system for the epoxidized polybutadiene is a polycarboxylic acid, a polycarboxylic anhydride or mixtures thereof. As the acid or anhydride component of the curing agent, a wide variety of aliphatic, alicyclic and aromatic polycarboxylic acids and anhydrides may be used, alone or in mixtures. The polycarboxylic acids and anhydrides may be dicarboxylic or tricarboxylic. Useful acids include maleic, succinic, dodecenyl succinic, phthalic, di- and tetrachlorophthalic, tetrahydrophthalic, hexahydrophthalic, chlorendic, chloromaleic, dichloromaleic, citraconic, pyromellitic, itaconic, bicyclo(2,2,1)-5-heptene-2,3-dicarboxylic, bicyclo(2,2,1)-5-methyl-5-heptene-2,3-dicarboxylic, trimellitic, and many others of varied structure and properties. In actual practice, anhydrides are preferred to acids. The particular acid or anhydride selected will, of course, vary with the desired pot life and the properties desired in the final product.

The amount of acid or anhydride required for optimum properties in the coating composition depends upon the degree of epoxidation of the epoxidized polybutadiene and also on the particular acid or anhydride employed. In theory, one epoxide equivalent of epoxidized polybutadiene, that is, the amount of epoxidized polybutadiene containing one atom of epoxy oxygen, requires at least one carboxyl equivalent of curing agent. A simple dicarboxylic acid or anhydride contains two equivalents. Of course slightly less or more than the theoretical amount of acid or anhydride may be employed. In general, about 0.5–1.2 equivalents of acid or anhydride may be employed for each epoxide equivalent. If less than 0.5 equivalent is employed the final coating will not be properly cured and thus will not have the desired properties.

The coatings of this invention may additionally contain, if desired, stannous octoate as a catalyst for the epoxy curing agent. In general, when an anhydride is used as the curing agent, the use of stannous octoate is desirable to accelerate the cure. When an acid is used as the curing agent, the cure rate is quite fast and no catalyst is necessary. When stannous octoate is used, the amount of catalyst employed will depend upon the particular curing agent, and the amount of curing agent. Stannous octoate is generally present in an amount of about 1 part per hundred parts of epoxidized polybutadiene. Of course, greater or lesser amounts in the range of about 0.5–2 parts per hundred give satisfactory results.

The coating compositions of this invention cannot be completely formulated until they are ready for use, since the curing agent will begin reacting with the epoxy resin as soon as they are blended. For this reason the coating compositions of this invention are prepared as a two-package system; one containing the epoxy resin and the other containing the curing agent. When a catalyst is used it is added to the portion containing the curing agent.

The coal tar can be added to either the epoxidized polybutadiene portion or to the curing agent portion. However, it is preferable to add the coal tar to the epoxidized polybutadiene portion so that they can be thoroughly blended before the entire coating composition is mixed.

In addition to the above ingredients the coating compositions of this invention may also contain other additives, if desired, to impart particular properties to the final coating composition. For example, it is generally desirable to add a filler to the coating composition. Suitable inorganic mineral fillers include silicates such as talcs and clays, silicas, mica, barium sulfate, and the like. These fillers serve two important functions: to lower the cost of the coating composition, and to impart thixotropy which allows application of thick films on verticle surfaces. The amount of filler which is employed should be about 20–50% by weight of the total solids in the system; that is, the total of the epoxy resin, curing agent, coal tar and filler. The filler may be added to the epoxidized polybutadiene portion or the curing agent portion, or to both. Preferably, the filler is added to the epoxidized polybutadiene portion.

The coating compositions of this invention may also contain a volatile vehicle or solvent to impart a fluid consistency to the composition, if desired. Suitable solvents which may be used as primary or secondary solvents include aliphatic and aromatic naphthas, oxygenated solvents such as ketones, alcohols, glycol ethers, esters, nitro-paraffin, and the like. These solvents are generally added to both parts of the two-package system. Good results have been achieved in which 20–30% by weight of the total coating composition is volatile solvent. In a typical two-package coating system, the curing agent portion of the coating system will contain about 50% by weight volatile solvent, while the portion containing the epoxy resin and coal tar will contain about 25% by weight volatile solvent.

The coating compositions of this invention may be applied to any desired surface by spraying, brushing, or roller coating. These coatings are used primarily as heavy industrial maintenance coatings for structural steel and for tank linings and in marine applications as coatings for piers and ship bottoms. Typical surfaces to which these coatings may be applied include metal surfaces, such as iron, steel, and aluminum, wood, masonry products, as well as most any other structural material.

Coatings prepared in accordance with this invention will develop outstanding resistance to mineral and organic acids, water and aqueous salt solutions after aging for about one week. The coatings are resistant to heat up to about 350° F. for prolonged periods of time with no apparent degradation, but rather an improvement in resistance properties.

The following examples, illustrating the novel coating compositions of this invention, are presented without any intention that the invention be limited thereto. All parts and percentages are by weight.

EXAMPLE 1

Butadiene was polymerized as follows: About 4.3 parts of sodium as a 45% dispersion in kerosene and 162 parts of benzene were charged to an agitated reactor, the temperature was raised to 90° C., and 3.0 parts of technical grade butadiene was added. The temperature was maintained at about 85° C., while 97 parts of butadiene and 20 parts of dioxane were added over a period of 3.5 hours. The reaction ingredients were then cooled to 50° C. and the catalyst was destroyed by the addition of 19 parts of glacial acetic acid. The mixture was filtered through 21 parts of soda ash, and the filtrate was stripped of volatiles over a temperature range of 19–55° C. at 23–57 mm. Hg. The residue was liquid polybutadiene having an iodine number of 383, a viscosity of 16.4 poises at 25° C. extrapolated to zero shear and a number average molecular weight of 980.

The polybutadiene was epoxidized as follows: About 100 parts of the polybutadiene, 100 parts of benzene, 32 parts of Dowex resin 50 X-12 (a sulfonated styrene-divinylbenzene polymer crosslinked with 12% divinylbenzene), and 16 parts of glacial acetic acid were heated with agitation to 60° C. About 70 parts of 50% hydrogen peroxide was then added over a period of 3 hrs. The temperature was maintained at 60° C. for an additional 2 hrs. after which the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 80° C. and 60 mm. Hg. The epoxidized polybutadiene obtained as residue had an epoxy oxygen content of 8.98% and a viscosity of 1685 poises at 25° C. extrapolated to zero shear.

A two-package coating composition was prepared from the above epoxidized polybutadiene using the following formulation:

*Part A*

| Ingredient: | Parts |
|---|---|
| Epoxidized polybutadiene | 140 |
| Talc | 140 |
| Methyl isobutyl ketone | 60 |

*Part B*

| Ingredient: | Parts |
|---|---|
| Coal tar | 135 |
| Aerated silica | 15 |
| Chlorendic anhydride | 135 |
| Xylol | 20 |
| Stannous octoate | 1.4 |

The coal tar used in the above formulation was a commercially available material having a specific gravity of 1.18, a ring and ball softening point of 45 and contained 10% material insoluble in carbon bisulfide.

Parts A and B were intimately mixed together with power stirring and applied to a solvent cleaned cold rolled steel plate by brushing. The resulting coating dried overnight to a soft, but tack-free state, and in about one week to a hard and abrasion resistant film. The above mixture had a useful pot life in excess of 6 hrs. at 80° F.

EXAMPLE 2

Butadiene was polymerized as follows: About 4.3 parts of sodium as a 46% dispersion in kerosene and 162 parts of benzene were charged to an agitated reactor, the temperature was raised to 90° C., and 10 parts of technical grade butadiene was added. The temperature was maintained at about 85° C., while 90 parts of butadiene and 20 parts of dioxane were added over a period of 3.5 hours. The reaction ingredients were cooled to 50° C. and the catalyst was destroyed by the addition of 19 parts of glacial acetic acid. The mixture was then filtered and stripped as described in Example 1. The liquid polybutadiene product had an iodine number of 390 and a viscosity of 17 poises at 25° C. extrapolated to zero shear.

The polybutadiene was epoxidized as follows: One hundred parts of polybutadiene was dissolved in 100 parts of benzene, and 10 parts of 90% formic acid was added. The mixture was maintained at 60° C. while 70 parts of 50% hydrogen peroxide was added over a period of three hours. The reaction continued for an additional four hours, and the product was recovered as described in Example 1. The resulting epoxidized polybutadiene had an epoxy content of 9.0% and a viscosity of 2,068 poises at 25° C. and zero shear.

Using the epoxidized polybutadiene prepared above and a coal tar having a specific gravity of 1.22, a ring and ball softening point of 55, and containing 15% material insoluble in carbon bisulfide, a coating composition was prepared from the following formulation:

*Part A*

| Ingredient: | Parts |
|---|---|
| Coal tar | 100 |
| Epoxidized polybutadiene | 100 |
| Aerated silica | 15 |
| Talc | 200 |
| Methyl isobutyl ketone | 50 |

*Part B*

| Ingredient: | Parts |
|---|---|
| Chlorendic anhydride | 100 |
| Aromatic naphtha | 125 |
| Methyl isobutyl ketone | 75 |
| Stannous octoate | 1 |

Part A and Part B were blended thoroughly. The composition thus obtained had a pot life in excess of 6 hrs. at 80° F. When applied by spraying to a concrete block at a film thickness of 7–10 mils (dry), the coating dried to a soft tack-free film overnight and hardened in about one week to a tough abrasion resistant film.

EXAMPLE 3

Using the epoxidized polybutadiene prepared in Example 2 and the coal tar described in Example 1, a coating composition was prepared from the following formulation:

*Part A*

| Ingredient: | Parts |
|---|---|
| Coal tar | 100 |
| Epoxidized polybutadiene | 100 |
| Aerated silica | 20 |
| Talc | 110 |
| Xylol | 20 |

*Part B*

| Ingredient: | Parts |
|---|---|
| Oxalic acid | 25 |
| Butanol | 100 |

Parts A and B were intimately mixed together with a power stirrer and applied to a sand blasted steel plate by brushing. The resulting coating dried overnight to a soft but tack-free state, and in about a week to a hard and abrasion resistant film. The mixture had a useful pot life of about 6 hrs. at 80° F.

As will be apparent to those skilled in the art, numerous modifications and variations of the coating compositions illustrated above may be made without departing from the spirit of the invention or the scope of the following claims.

I claim:
1. A novel coating composition, which comprises a coal tar having a softening point of 35–60° C., 0.9–1.1 parts, per part of coal tar, of an epoxidized polybutadiene having an epoxy oxygen content of 8–10% by weight, 0.7–1.0 equivalent, per equivalent of epoxy oxygen, of chlorendic anhydride, and 0.5–2% by weight, based upon the epoxidized polybutadiene, of stannous octoate.

2. A novel coating composition, which comprises a coal tar having a softening point of 35–60° C., 0.9–1.1 parts, per part of coal tar, of an epoxidized polybutadiene having an epoxy content of 8–10% by weight, 0.7–1.0 equivalent, per equivalent of epoxy oxygen, of chlorendic anhydride, 0.5–2% by weight, based upon the epoxidized polybutadiene, of stannous octoate, 20–50% by weight, based upon the total solids in the composition, of an inorganic filler, and 20–30% by weight, based upon the total coating composition, of a volatile solvent.

References Cited

UNITED STATES PATENTS

| 2,765,288 | 10/1956 | Whittier et al. | 260—28 |
| 2,829,135 | 4/1958 | Greenspan | 260—94.7 |
| 2,868,749 | 1/1959 | Hugg | 260—28.5 |
| 3,073,792 | 1/1963 | Greenspan | 260—2 |

OTHER REFERENCES

Rose: The Condensed Chemical Dictionary, Reinhold Publishing Corp., New York, pages 253 and 1070.

FMC Corporation, New Epoxy Resins, January 1960, pages 5 and 10–15.

MORRIS LIEBMAN, *Primary Examiner.*

D. C. KOLASCH, *Examiner.*

B. A. AMERNICK, *Assistant Examiner.*